(12) United States Patent
Kress

(10) Patent No.: US 9,815,131 B2
(45) Date of Patent: Nov. 14, 2017

(54) TOOL FOR MACHINING WORKPIECES

(71) Applicant: Mapal Fabrik für Präzisionswerkzeuge Dr. Kress KG, Aalen (DE)

(72) Inventor: Dieter Kress, Aalen (DE)

(73) Assignee: MAPAL FABRIK FUR PRAZISIONWERKZEUGE DR. KRESS KG, Aalen (DE)

( * ) Notice: Subject to any disclaimer, the term of this patent is extended or adjusted under 35 U.S.C. 154(b) by 174 days.

(21) Appl. No.: 14/427,474

(22) PCT Filed: Sep. 13, 2013

(86) PCT No.: PCT/EP2013/069035
§ 371 (c)(1),
(2) Date: Mar. 11, 2015

(87) PCT Pub. No.: WO2014/041130
PCT Pub. Date: Mar. 20, 2014

(65) Prior Publication Data
US 2015/0217387 A1    Aug. 6, 2015

(30) Foreign Application Priority Data

Sep. 17, 2012   (DE) .................. 10 2012 018 643

(51) Int. Cl.
*B23D 77/04*   (2006.01)
*B23B 29/034*  (2006.01)
*B23C 5/24*    (2006.01)

(52) U.S. Cl.
CPC .......... *B23D 77/04* (2013.01); *B23B 29/0341* (2013.01); *B23C 5/2472* (2013.01);
(Continued)

(58) Field of Classification Search
CPC   B23D 77/04; B23D 77/044; B23D 2277/068; B23B 29/0341; B23C 5/241;
(Continued)

(56) References Cited

U.S. PATENT DOCUMENTS 4,318,647 A    3/1982   Erkfritz
4,848,977 A *  7/1989   Kieninger ............... B23C 5/207
                                                          407/39
(Continued)

FOREIGN PATENT DOCUMENTS

CN          101085479 A      12/2007
DE       102007007377 A1      8/2008
(Continued)

OTHER PUBLICATIONS

English Translation of International Preliminary Report on Patentability and Written Opinion regarding International Application No. PCT/EP2013/069035.
(Continued)

*Primary Examiner* — Eric A Gates
(74) *Attorney, Agent, or Firm* — Stephen T. Olson; Harness, Dickey & Pierce, P.L.C.

(57) ABSTRACT

A reamer or similar tool comprising a cutting device having a cutting edge, a clamping device, whereby the cutting device can be clamped to the main body of the tool, an adjusting device that interacts with the cutting device, for adjusting the machining diameter of the tool, and a guiding device comprising an elongated guiding element, which interacts with an elongated guiding receptacle such that the cutting device can be guided in a sliding manner perpendicularly to the center axis during a displacement when the adjusting device is activated. The guiding element and the guiding receptacle extend perpendicularly to the center axis of the main body of the tool. The guiding device of the tool
(Continued)

has a single guiding element and/or a single guiding receptacle, and the guiding element has an elongated elevation and the guiding receptacle has an elongated recess.

17 Claims, 5 Drawing Sheets

(52) U.S. Cl.
CPC ...... *B23D 77/044* (2013.01); *B23D 2277/068* (2013.01); *Y10T 407/227* (2015.01); *Y10T 408/858* (2015.01); *Y10T 408/85995* (2015.01); *Y10T 408/885* (2015.01)

(58) Field of Classification Search
CPC ............... B23C 5/2472; Y10T 408/858; Y10T 408/8598; Y10T 408/85995; Y10T 407/227

See application file for complete search history.

(56) References Cited

U.S. PATENT DOCUMENTS

| | | | |
|---|---|---|---|
| 5,330,297 A | 7/1994 | Engstrand | |
| 6,254,319 B1* | 7/2001 | Maier | B23C 5/2444 |
| | | | 407/45 |
| 6,692,198 B2* | 2/2004 | Kress | B23C 5/2406 |
| | | | 407/36 |
| 7,322,777 B2* | 1/2008 | Jager | B23B 27/1655 |
| | | | 407/48 |
| 8,308,398 B2* | 11/2012 | Hecht | B23C 5/2406 |
| | | | 407/103 |
| 8,511,942 B2* | 8/2013 | Kretzschmann | B23B 29/03417 |
| | | | 407/36 |
| 9,481,043 B2* | 11/2016 | Mergenthaler | B23C 5/2472 |
| 2003/0086766 A1* | 5/2003 | Andras | B23B 27/1651 |
| | | | 407/102 |
| 2007/0280799 A1 | 12/2007 | Takiguchi et al. | |
| 2010/0028091 A1* | 2/2010 | Satran | B23C 5/241 |
| | | | 407/39 |
| 2010/0143058 A1 | 6/2010 | Takiguchi et al. | |
| 2010/0202843 A1 | 8/2010 | Kress | |
| 2012/0219369 A1 | 8/2012 | Kress | |

FOREIGN PATENT DOCUMENTS

| | | |
|---|---|---|
| EP | 1750881 B1 | 2/2007 |
| JP | 56-157906 A | 12/1981 |
| JP | 63-64408 U | 4/1988 |
| JP | 2007-508954 A | 4/2007 |
| WO | 2005105355 A2 | 11/2005 |
| WO | WO 2005105355 A2 * | 11/2005 ........... B23D 77/025 |
| WO | 2009030454 A1 | 3/2009 |
| WO | WO-2010/069541 A1 | 6/2010 |

OTHER PUBLICATIONS

Office Action dated May 5, 2016 of the Chinese Patent Application No. 201380048401.8, which corresponds to the above-identified application. (In English and Chinese).

International Search Report and Written Opinion of the ISA, ISA/EP, Rijswijk, NL, dated Nov. 19, 2013.

Notice of Reasons for Rejection regarding Japanese Application No. 2015-531576, dated May 17, 2016.

* cited by examiner

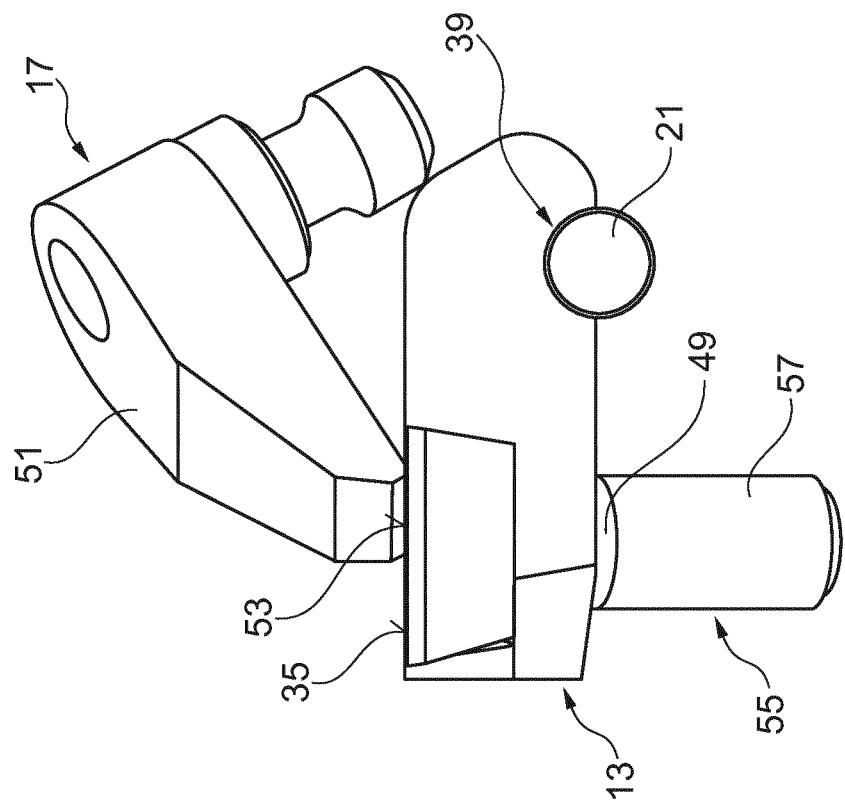
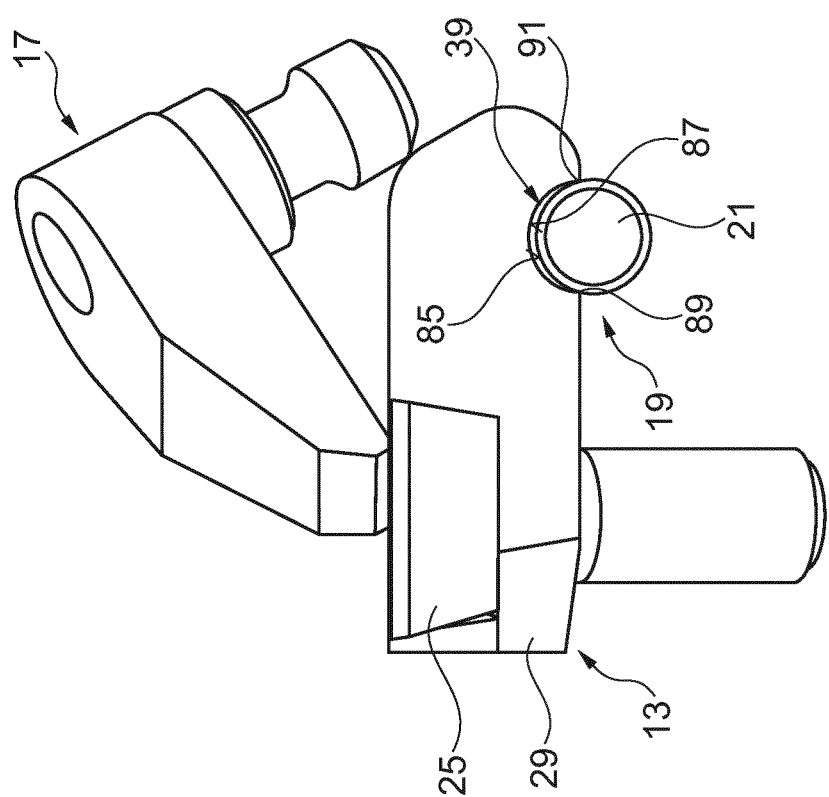

TOOL FOR MACHINING WORKPIECES

CROSS-REFERENCE TO RELATED APPLICATIONS

This application is a 371 U.S. National Phase of PCT International Application No. PCT/EP2013/069035, filed on Sep. 13, 2013, which claims the benefit and priority of German Patent Application No. 102012018643.6, filed on Sep. 17, 2012. The entire disclosures of each of the above applications are incorporated herein by reference.

FIELD

The disclosure relates to a tool for machining holes in workpieces.

BACKGROUND

Tools of the type mentioned here are known, in particular fine machining tools such as reamers and the like. When machining holes in workpieces, a relative rotational movement between tool and workpiece is realized in order to remove chips from the surface of the hole. As a rule, the tool is set into rotation and displaced in the direction of its axis of rotation with respect to a hole in the workpiece. The tool has at least one geometrically defined cutting edge, of which, the major cutting edge, is inclined in the direction of the feed movement of the tool. The minor cutting edge, which as a rule slopes in the opposite direction to the feed direction, is joined to the major cutting edge, as a result of which a taper is realized. When tools of this kind are set up, not only must the machining diameter of the tool be adjusted but also the taper. It has been established that the taper frequently changes when the diameter is adjusted and, vice versa, the required diameter is not maintained when the taper is adjusted. In order to avoid this disadvantage, in known tools, a guiding surface, which corresponds to an appropriate contact surface in the main body of the tool, is created by means of a side surface of a cutting body which incorporates the at least one geometrically determined cutting edge. In doing so, special cutting bodies are required, with which the number of available cutting edges is reduced. It is also known to accommodate cutting bodies of the kind mentioned here in receptacles, also referred to as cassettes, on which the adjusting forces for realizing the required diameter and the required taper act. This results in the disadvantage that, in the case of cassettes which swivel about a point, the taper of the at least one cutting edge changes when adjusting the machining diameter of the tool. Cassettes with two adjusting wedges, the setting of which is complicated and time-consuming, also exist.

SUMMARY

The object of the disclosure is therefore to create a tool for machining holes in workpieces which avoids the disadvantages mentioned here.

A tool of the kind mentioned above is realized in order to achieve this object. The tool, which is used in particular for the fine machining of holes and which, in particular, is designed as a reamer, has a main body, a cutting device, a clamping device and an adjusting device. It is also provided with a guiding device which is used when adjusting the cutting device to guide said cutting device accurately along an imaginary line running radially with respect to the main body of the tool, such that the required and pre-set taper does not change. The tool is characterized in that the guiding device has a single guiding element and/or a single guiding receptacle, wherein the guiding element and the guiding receptacle interact. The guiding element has an elongated elevation and the guiding receptacle an elongated recess, thus guaranteeing optimum guiding of the cutting device of the tool when adjusting the machining diameter.

Particularly preferred is an exemplary embodiment of the tool in which the guiding element and/or guiding receptacle extends over a region of the width of the cutting device and/or a contact surface of the main body, against which the cutting device is pressed by means of the clamping device. As the guiding element or guiding receptacle extends over a region of the width, preferably over the whole width, this results in particularly accurate guiding forces which prevent a swiveling of the cutting device while the machining diameter is being adjusted.

Particularly preferred is an exemplary embodiment of the tool in which the guiding element comprises a pin inserted into the main body of the tool or into the cutting device, the longitudinal axis of which extends perpendicular to the center axis of the main body of the tool. The guiding element can be relatively easily and inexpensively realized in this way.

Preferred is an exemplary embodiment of the tool in which the guiding element and/or the guiding receptacle has two guiding regions which are arranged at a distance from one another and extend at least to the edge of the cutting device or the contact surface in the main body of the tool. This enables the cutting device to be guided particularly accurately.

In addition, particularly preferred is an exemplary embodiment of the tool in which the cutting device has at least one supporting surface arranged at a distance from the guiding element or from the guiding receptacle. In this way, the cutting device, which is supported on the contact surface in the main body of the tool, is retained very accurately against the tool so that set machining diameters and also a pre-selected taper are accurately maintained in such a way that the surface of the machined hole is characterized by a high surface quality and very accurate adherence to dimensions.

Particularly preferred is an exemplary embodiment of the tool in which the cutting device has a base surface and in which a three-point contact with the main body of the tool is realized in the region of this base surface. The cutting device is supported by means of two guiding regions of the guiding device and by means of a supporting surface on the main body, thus very reliably avoiding unwanted tilting of the cutting device.

In addition, particularly preferred is an exemplary embodiment of the tool in which a three-point contact is realized by means of the two guiding regions and by means of a third contact surface which lies in the region of a side surface of the cutting device. Here, the adjusting device engages with the cutting device. This three-point contact ensures that unwanted tilting of the cutting device is also highly reliably avoided with regard to the adjusting device, so that the adjustment of the tool is very accurate.

Furthermore, particularly preferred is an exemplary embodiment of the tool in which the cutting device also includes a receptacle, referred to as a cassette, in which the cutter plate which incorporates the at least one geometrically determined cutting edge is accommodated. At the same time, it is provided that the guiding element or guiding receptacle is realized on a base surface of the receptacle of the cutting device. Dividing the cutting device into cutter plate and receptacle results in the advantage that, if the cutter plate breaks, the probability that the main body of the tool is damaged is very extensively reduced. Rather, in this case, it is ensured that, at worst, the cassette is damaged and can be easily and inexpensively replaced. A further advantage of dividing the cutting element into receptacle and separate cutter plate is that specially designed cutter plates, which are also referred to as special cutting edges, can be dispensed with. These are characterized in that their side surfaces are designed such that adjusting devices can engage therein. With cutter plates of this kind, regions which can be provided with cutting edges are therefore lost. Rather, with the exemplary embodiment presented here, it is possible to use normal cutter plates in the cassettes in such a way that a required taper is produced. In doing so, it is not necessary for the cutter plates themselves to provide contact surfaces for adjusting devices.

Further embodiments can be seen from the dependent claims.

The disclosure is explained in more detail below with reference to the drawing. In the drawing:

BRIEF DESCRIPTION OF DRAWINGS

FIG. 6 shows a third schematic diagram for clarifying the interaction of elements of the tool according to FIG. 1 with unclamped cutting device; and FIG. 7 shows a fourth schematic diagram for clarifying the interaction of elements of the tool according to FIG. 1 with clamped cutting device.

DETAILED DESCRIPTION

Figure 1:
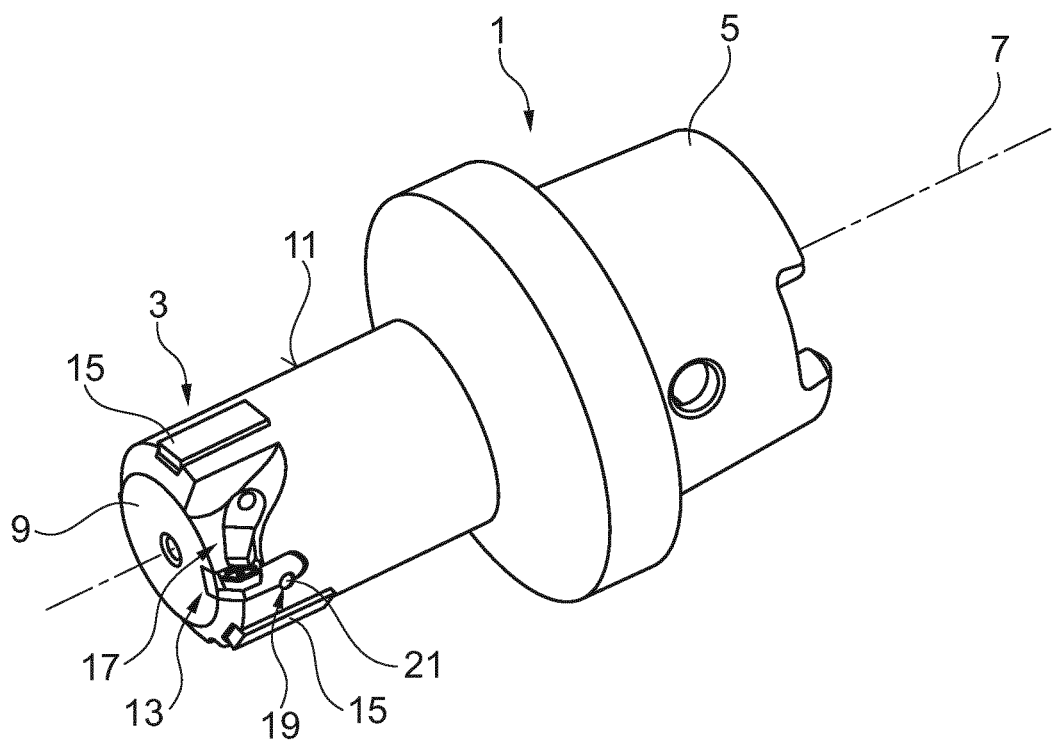
FIG. 1 shows a perspective view of a tool for machining holes in workpieces.

FIG. 1 depicts a tool 1, in particular a fine boring tool, preferably a reamer. The tool 1 has a tool head 3 and a shaft 5, which here is designed as a hollow shaft and serves to secure the tool 1 in a machine tool, an adapter, intermediate piece or similar. A hollow shaft of the kind shown here and likewise the clamping of the tool are known and are therefore not discussed in more detail here. As a rule, a torque is introduced via the shaft 5 into the tool 1, thus setting it into rotation in order to machine the hole of a workpiece. In doing so, the tool 1 rotates about its center axis 7.

The tool head 3 has a main body 9 with a circumferential surface 11 in which the at least one cutting device 13 and at least one guiding part 15 are fitted. As a rule, a plurality of guiding parts, also referred to as guiding strip, are fitted in the main body 9, which absorb the forces introduced into the tool 1 by the cutting device 13 when a workpiece is machined and guide the tool 1 accurately in the machined hole.

The basic construction of a tool shown here or a reamer is known and is therefore not discussed in more detail here.

The cutting device 13 has at least one geometrically determined cutting edge which is used to machine the surface of the hole. The cutting device 13 is securely clamped by means of a clamping device 17 in the main body 9 of the tool 1.

With the help of an adjusting device, which is not visible in FIG. 1 but is described in more detail below, the cutting device 13 is displaced within the main body 9 of the tool 1, specifically perpendicular to its center axis 7 in order to set the machining diameter of the tool 1 to a required dimension.

The tool 1 shown here has a guiding device 19, which comprises a guiding element 21 and is used to guide the cutting device 13 when the machining diameter of the tool 1 is adjusted so that the cutting device 13 remains in an exactly specified relative rotational position with respect to the main body 9 of the tool 1 while the diameter is adjusted.

Figure 2:
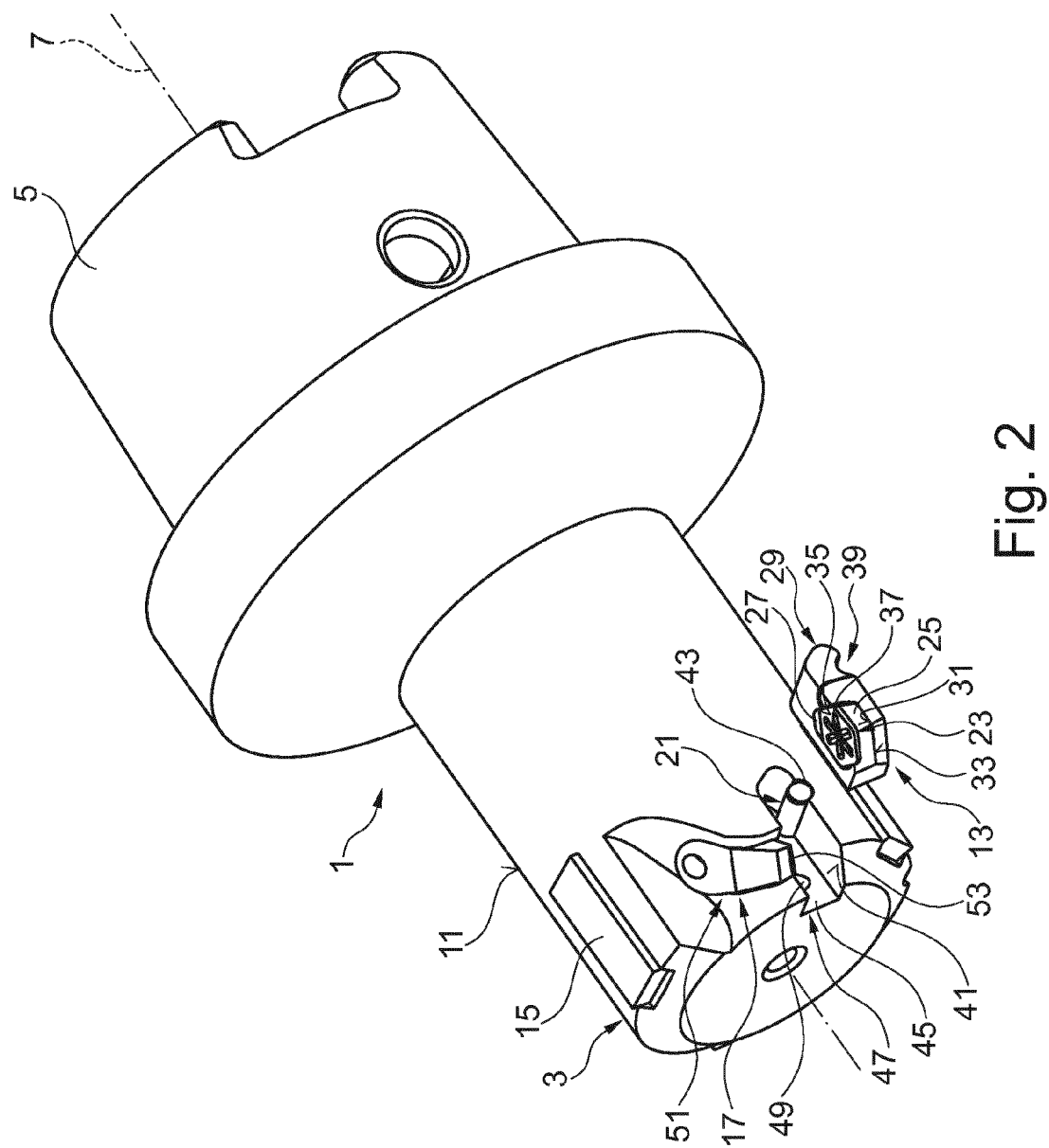
FIG. 2 shows a greatly enlarged perspective view of the tool according to FIG. 1, however with the cutting device removed.

FIG. 2 shows the tool 1 greatly enlarged. The same and functionally equivalent parts are provided with identical reference numbers so that, in this respect, reference is made to FIG. 1.

In the diagram according to FIG. 2, the cutting device 13 has been removed from its assembled position depicted in FIG. 1 so that, in this respect, this results in an exploded diagram with regard to this detail.

In this enlarged diagram, it can be seen that the cutting device 13 has a geometrically determined cutting edge 23. This is used to remove chips from the wall of a hole.

Basically, the cutting device 13 can be made in one piece and incorporate the cutting edge 23. When the cutting edge 23 wears, the complete cutting device 13 must then be replaced.

Particularly preferably, it is therefore provided that the cutting device 13 is designed in two parts and has a cutter plate 25 which is accommodated in a recess 27 which is realized in a receptacle 29. In the exemplary embodiment shown here, the cutter plate 25 is hexagonal in shape and rests with its underside 31 on the bottom 33 of the recess 27. At least one clamping slot 37 is provided in its top side. With the hexagonal cutter plate 25 shown here, three clamping slots 37 arranged in the form of a star are provided as is usual with cutter plates of this kind. The contour of the recess 27 is chosen such that the cutter plate 25 is retained in the recess 29 so that it cannot rotate and is securely supported on at least two supporting surfaces which interact with corresponding side surfaces of the cutter plate 25.

It can be seen from FIG. 2 that the guiding device 19 has an elongated guiding element 21 and also a guiding receptacle 39 which interacts with the guiding element 21. The arrangement of the guiding element 21 and the guiding receptacle 39 can very easily be interchanged, that is to say the guiding element 21 can be provided on the cutting device 13 and the guiding receptacle 39 on the main body 9 of the tool 1.

In the following, it is assumed that—as shown—the guiding element 21 is provided on the main body 9 and the guiding receptacle 39 on the cutting device 13.

Here, the guiding element 21 is fitted, preferably pressed, into a contact surface 41, specifically into a slot 43 in the main body 9. However, the decisive factor is only that the guiding device 19 has an elongated guiding element on the one hand and an elongated guiding receptacle on the other. The guiding element can be realized, for example, by an elevation on the contact surface 41 which is carved out of the contact surface 41 by grinding, milling or laser cutting. Other methods for producing an elevation of this kind, wire erosion or similar, can be used here.

In FIG. 2, the guiding element 21 is in the form of a continuous pin which has a continuous cylindrical outer surface. It is in fact possible to realize the single guiding element 21 specified here by two partial pins arranged at an axial distance from one another, or to provide the outer surface of the pin, here shown continuous, with a slot in the center, thus forming two guiding regions at an axial distance from one another which are preferably arranged such that they are arranged close to the lateral side surface of the cutting device 13.

Adjoining the contact surface 41 is a side surface 45 which borders a recess 47 in which the cutting device 13 can be fitted in the main body 9 of the tool 1. A recess with an adjusting wedge 49, which is part of an adjusting device that is discussed in more detail below, can be seen in the side surface 45.

The clamping device 17 has a known clamping claw 51 which engages with a clamping lip 53 on the top side 35 of the cutting plate 25, preferably in a clamping slot 37, such as is provided in the exemplary embodiment of the cutting plate 25 shown here.

Figure 3:
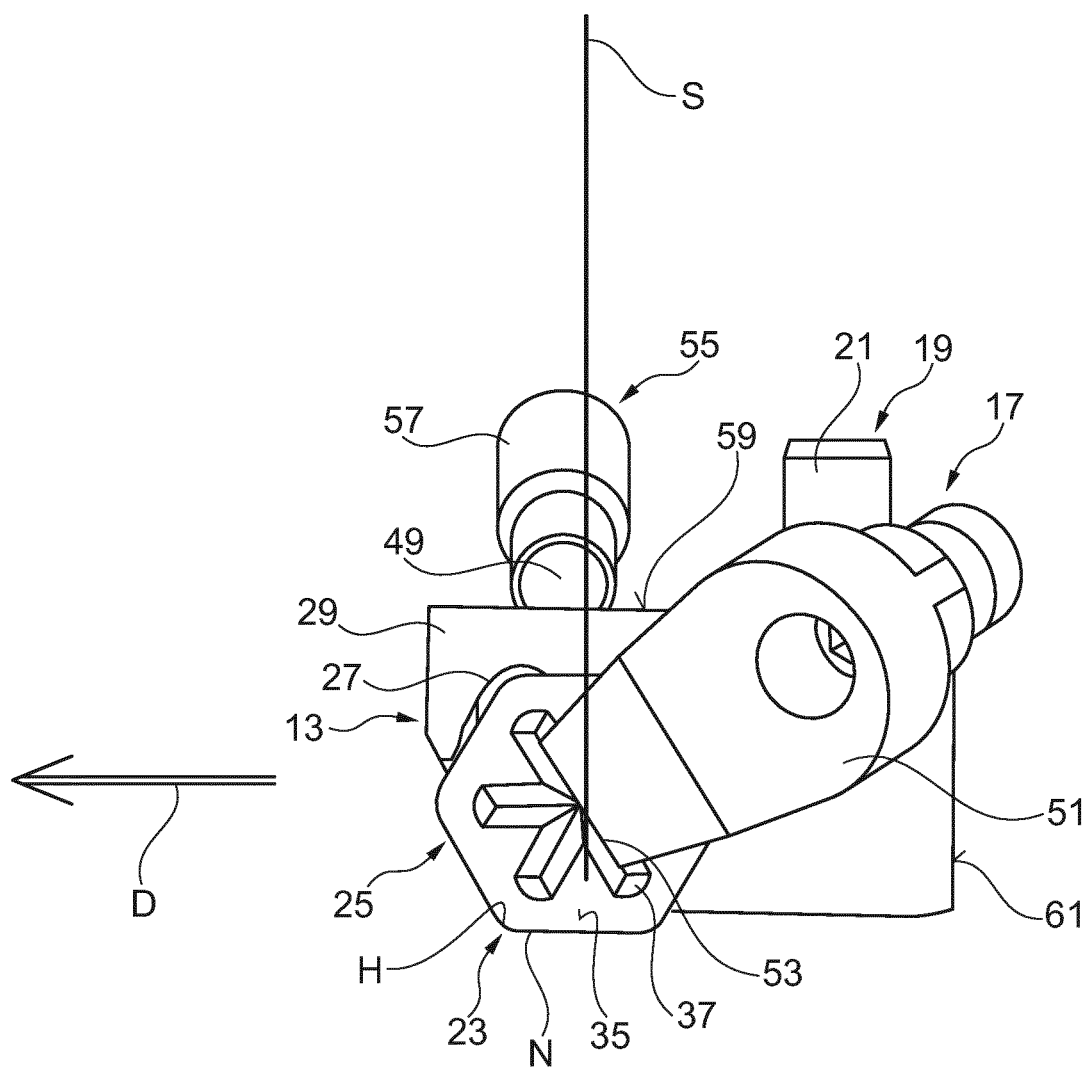
FIG. 3 shows a first schematic diagram for clarifying the interaction of elements of the tool shown in FIG. 1.

FIG. 3 shows a first schematic diagram for clarifying the interaction of elements of the tool 1, specifically the cutting device 13 with the guiding device 19 and the clamping device 17. The same and functionally equivalent parts are provided with identical reference numbers so that, in this respect, reference is made to the previous figures.

FIG. 3 shows how, in the fitted state of the cutting device 13, the clamping lip 53 of the clamping claw 51 of the clamping device 17 engages in a clamping slot 37 in the top side 35 of the cutter plate 25 of the cutting device 13, wherein the cutter plate 25 is arranged in a recess 27 of the receptacle 29.

FIG. 3 shows the adjusting wedge 49 of the adjusting device 55, which here is preferably designed such that the adjusting wedge 49 interacts with an adjusting screw 57, which is merely indicated here and can be displaced together with the adjusting wedge 49 in an appropriate hole in the main body 9 of the tool 1 by means of a threaded drive. FIG. 3 shows that the center axis of both the adjusting wedge 49 and the adjusting screw 57 runs at an angle into the plane of the drawing of FIG. 3. The adjusting wedge 49 engages with a side surface 59 of the cutting device 13, here with a side surface of the receptacle 29. When the adjusting wedge 49 is advanced, according to the view of FIG. 3 the cutting device 13 is displaced downwards, wherein this movement corresponds to a radially outwards movement with respect to the main body 9 of the tool 1, that is to say radially with respect to the center axis 7 of the main body 9.

The guiding element 21 of the guiding device 19, which in the exemplary embodiment shown here is realized in the form of a pin, can be seen here.

It can be seen from FIG. 3 that the forces exerted by the adjusting wedge 49 on the cutting device 13 act on the cutter plate 25 such that the forces introduced via the geometrically determined cutting edge 23 into the cutter plate 25 and into the receptacle 29, that is to say into the cutting device 13, are absorbed extremely well.

Here, the adjusting device 55 and the guiding device 19 are at a distance from one another—in FIG. 3 measured in the horizontal direction. Where possible, the adjusting device 55 acts in a region below or opposite the geometrically determined cutting edge 23. The guiding device 19 is arranged closer to the right-hand end 61 of the cutting device 13, that is to say at the right-hand end of the receptacle 29, in order to guarantee optimum guiding of the cutting device 13 against the main body 9 of the tool 1, which is not shown here, while the cutting device 13 is displaced radially outwards with respect to the center axis 7, that is to say downwards in FIG. 3, when the adjusting device 19 is displaced radially outwards in order to adjust the machining diameter of the cutting edge 23.

The cutting edge 23 identified in FIG. 3 constitutes the so-called active cutting edge of the cutter plate 25 which, in the installed position of the cutter plate 25 shown here, engages with the surface of a hole in the workpiece when the tool 1 is deployed. When this cutting edge wears, the cutter plate 25 can be rotated about an axis perpendicular to its top side 35 after the cutter plate has been removed from the recess 27 of the receptacle 29. As a result, a further cutting edge of the cutter plate 25 bordering the cutting edge 23 to the right and left engages with the workpiece to be machined and then constitutes the active cutting edge of the cutter plate 25.

The plan view of the cutter plate 25 chosen in FIG. 3 shows that the clamping slot 37, in which the clamping lip 53 of the clamping claw 51 of the adjusting device 55 engages, encloses an angle with an imaginary vertical line S. This leads to the forces exerted by the clamping claw 51 being divided, specifically into a first force component which—in the diagram according to FIG. 3—runs horizontally and presses the cutting device 13 against the guiding element 21, which is designed in the form of a pin. A further force component of the clamping claw 51 acts vertically upwards—in the diagram according to FIG. 3—so that the cutting device 13 is pressed against the adjusting wedge 49 with its side surface 59, here therefore with the side surface of the receptacle 29.

Figure 4:
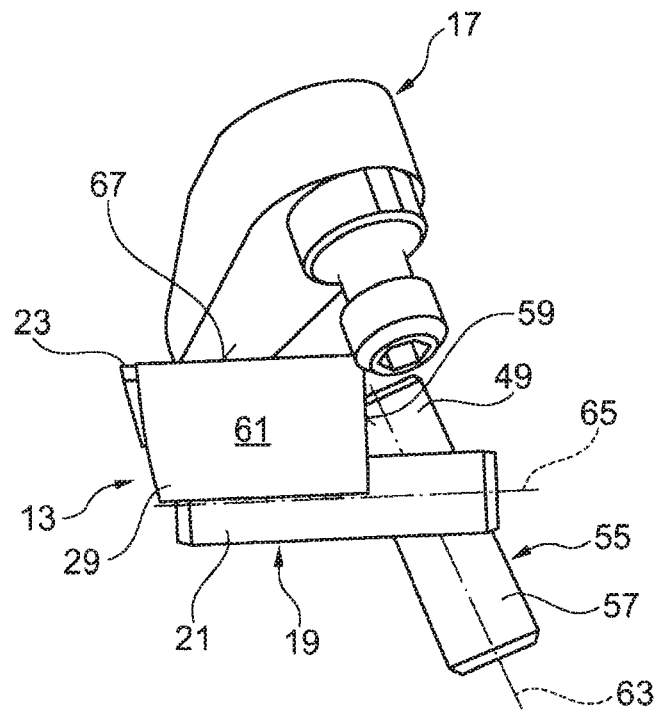
FIG. 4 shows a second schematic diagram for clarifying the interaction of elements of the tool shown in FIG. 1.

In a second schematic diagram for clarifying the interaction of elements of the tool 1, FIG. 4 shows the elements already shown in FIG. 3, albeit the cutting device 13 with the elements is arranged such that FIG. 4 shows the right-hand end 61 in plan view. The same and functionally equivalent parts are provided with identical reference numbers so that, in this respect, reference is made to the previous figures.

It can be seen here that the cutting device 13 has an active cutting edge 23 which projects beyond the left-hand outer surface of the cutting device 13 or its receptacle 29 and can therefore engage with the surface of a hole to be machined.

The guiding element 21 of the guiding device 19 can also be seen here. The diagram according to FIG. 4 shows that the adjusting wedge 49 engages roughly centrally—referred to the height—with the side surface 59 of the cutting device 13 or its receptacle 29. This ensures that, when the cutter plate 25 or the cutting device 13 is adjusted, there is practically no tilting moment, as a result of which the cutter plate 25 would tilt about a vertical axis on the right-hand end 61. FIG. 4 also shows the adjusting screw 57 of the adjusting device 55 and also the clamping device 17.

When the adjusting device 55 is activated, a compressive force acts via the adjusting wedge 49 on the side surface 59, wherein the center axis 63 of the adjusting device 55 encloses an angle with a plane in which the side surface 59 lies. This results in a force component which presses perpendicularly on the side surface 59 and the cutting device 13 in a horizontal direction to the left according to the diagram in FIG. 4. The center axis 65 of the guiding element 21, which is here in the form of a pin, likewise runs horizontally, that is to say parallel to this force component of the compressive force of the adjusting part 49. The adjusting device 13 slides to the left on the guiding element 21 and is therefore optimally guided, wherein, in particular, tilting about an axis perpendicular to the top side 67 of the cutting device 13 is prevented.

Figure 5:
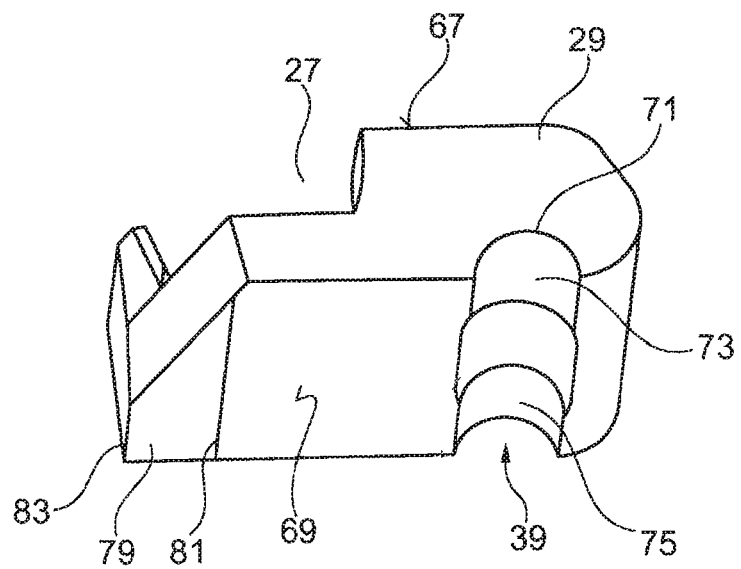
FIG. 5 shows a perspective bottom view of a receptacle for the cutting device of the tool shown in FIG. 1.

FIG. 5 shows the receptacle 29, that is to say a part of the cutting device 13, in perspective view from below, thus enabling the base surface 69 of the cutting device 13 or the receptacle 29 to be seen. The same and functionally equivalent parts are provided with identical reference numbers so that, in this respect, reference is made to the previous figures.

It can also be seen here that the recess 27, which accommodates the cutter plate 25 (not shown here), is formed in the top side 67 of the receptacle 29.

The guiding receptacle 39 of the guiding device 19, which here is in the form of slot 71 in the base surface 69, can be seen in this diagram. Here, the slot 71 is semicircular in shape and has two guiding regions which lie at a distance from one another and are formed as guiding surfaces 73 and 75, which are separate from one another—viewed in the axial direction of the slot 71—as a depression is made in the slot 71 which cuts the base of the slot 71 so that this surface is not continuous but includes the two guide surfaces 73 and 75 which are arranged at a distance from one another.

The guiding surfaces 73 and 75 extend over a region of the width of the cutting device 13 or the base surface 69 and preferably lie at the ends of the slot 71 so that, viewed in the longitudinal direction of the slot 71, this results in guiding surfaces 73 and 75 which lie as far out as possible so that the cutting device 13 is particularly well secured against tilting when the active cutting edge 23 is radially adjusted.

Particularly preferably, the cutting device 13 or, here, its receptacle 29, has a supporting surface 79 provided in the region of the base surface 69 which encloses an angle with the base surface 69 and merges into the base surface 69 via a bend 81. In doing so, the supporting surface 79 in the diagram chosen in FIG. 5 slopes from the bend 81 with respect to the base surface 69 so that the left-hand end 83 of the supporting surface 79 is set back from the base surface 69.

In the region of the base surface 69, two supporting regions of the cutting device 13 are therefore realized in the region of the guiding receptacle 39: it is supported by means of the guiding surfaces 73 and 75 on the guiding element 21 (not shown here). In the fitted state, the cutting device 13 is additionally supported on the contact surface 41 on the main body 9 of the tool 1 by means of the supporting surface 79, which is shown in FIG. 2. This results in a total of three supporting surfaces of a three-point contact of the cutting device 13 in the region of its base surface 69.

In a modified exemplary embodiment of the cutting device 13, it is provided that, in the region of the bend 81, the supporting surface 79 is angled with respect to the base surface 69 such that, in the clamped state of the cutting device 13, a three-point contact is realized in the following manner:

The cutting device 13 is supported in the region of its guiding receptacle 39, in particular with the two guiding surfaces 73 and 75, on the guiding element 21, in addition the bend 81 rests on the contact surface 41 on the main body 9 of the tool 1 such that the bend 81 forms the third point of the three-point contact. The supporting surface 79 is angled with respect to the base surface 69 in such a way that, in this exemplary embodiment, it no longer rests on the contact surface 41 on the main body 9 of the tool 1.

A further three-point contact results from the following:

The cutting device 13 rests with its guiding receptacle 39, in particular with the two guiding surfaces 73 and 75, on the guiding element 21 (not shown here) which, as explained with regard to the preceding figures, is in the form of a pin. This therefore results here in two contact surfaces of the cutting device 13. If these, as can be seen from FIG. 3, are securely clamped by means of the clamping claw 51 of the clamping device 17 to the main body 9 of the tool 1 (not shown here), then this also results in a contact with the adjusting wedge 49. A three-point contact is therefore also realized with regard to the diagram of FIG. 3, so that the cutting device 13 is securely and very accurately clamped to the main body 9 of the tool 1.

FIG. 6 shows a third schematic diagram for clarifying the interaction of elements of the tool 1, wherein the cutting device 13 is depicted in the unclamped state. The same and functionally equivalent parts are provided with identical reference numbers so that, in this respect, reference is made to the previous figures.

The cutting device 13, which preferably comprises the receptacle 29 and a cutter plate 25, is securely clamped by the clamping device 17 to the main body 9 of the tool 1 (not shown here), wherein, in this diagram, the clamping device 17 has not been finally activated so that the clamping device 13 is not yet clamped. The guiding device 19 with the guiding element 21, which runs perpendicular into the plane of the drawing of FIG. 6, and with the guiding receptacle 39 can be clearly seen here.

Preferably, it is provided that the guiding element 21 has a curved outer surface 85, preferably in the form of a circular arch, which projects beyond the mounting surface 41 depicted in FIG. 2. The guiding receptacle 39 has a curved inner surface 87, preferably in the form of a circular arch.

Preferably, it is provided that the guiding receptacle 39 is smaller than the guiding element 21, that is to say the radius of curvature of the inner surface 87 is less than the radius of curvature of the outer surface 85. As a result, the guiding receptacle 39 lies against the guiding element with two contact surfaces 89 and 91, wherein the contact surfaces 89 and 91 are more or less linear and run perpendicular to the plane of the diagram of FIG. 6, wherein the contact surfaces in the exemplary embodiment shown in FIG. 5 do not run continuously over the whole length of the slot 71 but are only realized in the region of the guide surfaces 73 and 75.

The inner surface 87 of the guiding receptacle 39 can also be realized by a prism or similar, in particular also in that the slot 71 is V-shaped and is sufficiently large that the guiding element 21 rests more or less linearly on the V-shaped aligned surfaces of a slot 71 of this kind and, as a result, contact surfaces, which then likewise run perpendicular to the plane of the diagram of FIG. 6, are formed.

Basically, it is also possible to realize the guiding element 21 in the form of an elongated polygonal element so that, with an appropriate inner surface of a guiding receptacle 39, a plurality of contact surfaces are formed at a distance from one another.

Finally, FIG. 7 shows a fourth schematic diagram of elements of the tool 1, wherein, here, the cutting device 13 is securely clamped in the main body 9 of the tool 1 by activating the clamping device 17. The same and functionally equivalent parts are provided with identical reference numbers so that, in this respect, reference is made to the previous figures.

The clamping device 17 exerts a force which acts perpendicularly on the top side of the cutting device 13, here the top side 35 of the cutter plate 25, via the clamping claw 51 and via the clamping lip 53, such that the cutting device 13 is pressed against the contact surface 41 shown in FIG. 2 by means of its base surface 69. As a result, the inner surface 87 of the guiding receptacle 39 is pressed against the outer surface 85 of the guiding element 21 so that the guiding surfaces 73 and 75 of the slot 71 of the guiding receptacle 39 rest against the guide element 21. Here, it is sufficient when preferably linear contact regions are also realized in this state. This results in an accurate guiding of the cutting device 13 viewed perpendicular to the plane of the diagram of FIG. 7 when the adjusting device 55 is activated and the adjusting wedge 49, by rotating the adjusting screw 57, exerts a compressive force from behind on the clamping device 13, specifically on its side surface 59, so that the cutting device 13 is pushed perpendicularly out of the plane of the diagram of FIG. 7.

From the comments relating to FIGS. 1 to 7, it is clear that, with the tool 1 shown here, the guiding device 19 guarantees an accurate alignment of the cutting device 13 so that, when the diameter of the tool 1 is adjusted, it is pushed accurately along the guiding element 21 which runs radially, that is to say perpendicularly, with respect to the center axis 7 of the tool 1. As a result, the geometrically determined cutting edge 23 without any tilting movements which would correspond to a swiveling movement of the cutting device 13 about an axis perpendicular thereto. As a result, a specified taper of the geometrically determined cutting edge 23 is accurately maintained when the diameter is adjusted.

In this regard, reference is again made to FIG. 3:

The geometrically determined cutting edge 23 has two regions, specifically a first region which slopes in the feed direction, specifically in the direction of the center axis 7 of the tool 1, when the tool 1 is advanced as indicated by a double arrow D during the machining of a hole in a workpiece. This first region is referred to as major cutting edge H.

The cutting edge 23 has a second region adjoining the major cutting edge H, which slopes in the opposite direction to the feed direction indicated by the double arrow D in the direction of the center axis 7 (not shown in FIG. 3) of the tool 1. With respect to an imaginary horizontal, the minor cutting edge N encloses an angle which—in the diagram according to FIG. 3—opens to the right, that is to say in the opposite direction to the feed direction D. A slope of 1 μm per 1 mm is normally realized here. On the other hand, the major cutting edge H encloses an angle with this imaginary horizontal which opens in the direction of the feed direction D.

The slope of the minor cutting edge N with respect to the imaginary horizontal is described as taper. The definition of major and minor cutting edge and of taper is basically known and is therefore not discussed in more detail here.

With the tool 1 according to the disclosure, the taper is defined with the cutter plate 25 arranged in a fixed rotational relationship in the receptacle 29 in a defined rotational position. It is therefore indeed possible to design the recess 27, which essentially has an inner contour which corresponds to the outer contour of the cutter plate 25, such that the cutter plate 25 is also arranged in a different position than that shown in FIG. 3, so that the minor cutting edge N slopes at a different angle with respect to the imaginary horizontal.

As the cutting device 13, that is to say the receptacle 29, due to the accurate guiding by the guiding device 19, does not carry out any tilting movement whatsoever when an adjusting force is applied by the adjusting device 55, a once specified taper of the minor cutting edge N of the cutting edge 23 is also retained when adjusting and readjusting the hole diameter of the tool 1.

It can be seen here that any play in the region of the guiding device 19 is removed by pressing the guiding receptacle 39 onto the guiding element 21, thus enabling the diameter to be adjusted without any tilting, wherein tilting is also reliably avoided when the cutting device 13 is loaded during the deployment of the tool 1.

If a cutter plate 25 is worn in all its corner regions, it can easily be replaced. If a new identical cutter plate 25 is fitted into the receptacle 29, the once specified taper is retained at all times.

In doing so, it is also possible to use different receptacles with differently oriented recesses in which identical cutter plates can be fitted. Different tapers can be specified for each receptacle as a result of the different orientation of the recess.

The cutting device 13 explained here is also characterized in that, when a cutting edge 23 wears, the whole cutting device 13 does not have to be replaced but only a part thereof, specifically the cutter plate 25 fitted in a recess 27 of the receptacle 29.

If the receptacle 29 should be damaged if the cutter plate 25 breaks, then, as a rule, the main body 9 of the tool 1 remains intact, so that, in this case, only the replacement of the cutter plate 25 and the receptacle 29 is required in order to be able to use the tool 1 once more.

A significant aspect with the tool 1, which has been explained here with reference to FIGS. 1 to 7, is that the guiding device 19 has only a single guiding element 21 and a single guiding receptacle 39 which interacts therewith. This enables the guiding device 19 to be realized easily and inexpensively, wherein, at the same time, it is guaranteed that an accurate guiding of the cutting device 13 is ensured. It is particularly advantageous when, as described here, at least one, preferably two, three-point contacts are realized, one in the region of the base surface 69 of the cutting device 13 and one, on the one hand, in the region of the base surface 69, specifically by means of the guiding surfaces 37 and 35, and also in the region of the contact surface of the adjusting part 49 on the side surface 59 of the clamping device 13.

Three-point contacts are mentioned several times in the present description. This implies that the cutting device 13 is supported in the region of these three-point contacts, specifically in the above-mentioned regions. The support can also be linear, for example in the region of the guide surfaces 73 and 75. This also applies to the exemplary embodiment in which the cutting device 13 is supported by means of the supporting surface 79 on the contact surface 41 of the main body 9. In particular, this applies in the case where the supporting surface 79 is angled with respect to the base surface 69 to such an extent that the cutting device 13 is only supported in the region of the bend 81 on the contact surface 41.

It is therefore not a prerequisite for achieving the advantages described here that an ideal point contact is actually realized.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:
1. A tool for machining holes in workpieces, the tool comprising:
a main body having a center axis;
at least one cutting device having at least one geometrically determined cutting edge;

a clamping device for securely clamping the cutting device to the main body of the tool;
an adjusting device which interacts with the cutting device for adjusting a machining diameter of the tool, and
a guiding device, the guiding device including an elongated guiding element which interacts with an elongated guiding receptacle such that the cutting device is guided in a sliding manner perpendicular to the center axis during a displacement when the adjusting device is activated, the guiding element is provided on one of the cutting device and the main body of the tool and the guiding receptacle is provided on the other of the cutting device and the main body of the tool, the guiding element and the guiding receptacle extending perpendicular to the center axis of the main body of the tool, the guiding device has at least one of a single guiding element and a single guiding receptacle, and the guiding element has an elongated elevation and the guiding receptacle has an elongated recess,
wherein the cutting device has a base surface and is supported by a three-point contact on the main body of the tool in a region of the base surface, the cutting device has at least one supporting surface arranged at a distance from the at least one of the single guiding element and the single guiding receptacle, the at least one supporting surface provided in the region of the base surface which encloses an angle with the base surface and merges into the base surface via a bend, and the cutting device is supported on a contact surface on the main body by the supporting surface or the bend,
wherein the supporting surface is angled with respect to the base surface such that the cutting device is only supported in a region of the bend on the contact surface.

2. The tool according to claim 1, wherein the at least one of the single guiding element and single guiding receptacle extends over at least one of a region of a width of the cutting device and the contact surface of the main body, against which the cutting device is pressed by the clamping device.

3. A tool for machining holes in workpieces, the tool comprising:
a main body having a center axis;
at least one cutting device having at least one geometrically determined cutting edge;
a clamping device for securely clamping the cutting device to the main body of the tool;
an adjusting device which interacts with the cutting device for adjusting a machining diameter of the tool, and
a guiding device, the guiding device including an elongated guiding element which interacts with an elongated guiding receptacle such that the cutting device is guided in a sliding manner perpendicular to the center axis during a displacement when the adjusting device is activated, the guiding element is provided on one of the cutting device and the main body of the tool and the guiding receptacle is provided on the other of the cutting device and the main body of the tool, the guiding element and the guiding receptacle extending perpendicular to the center axis of the main body of the tool, the guiding device has at least one of a single guiding element and a single guiding receptacle, and the guiding element has an elongated elevation and the guiding receptacle has an elongated recess,
wherein the cutting device has a base surface and is supported by a three-point contact on the main body of the tool in a region of the base surface, the cutting device has at least one supporting surface arranged at a distance from the at least one of the single guiding element and the single guiding receptacle, the at least one supporting surface provided in the region of the base surface which encloses an angle with the base surface and merges into the base surface via a bend, and the cutting device is supported on a contact surface on the main body by the supporting surface or the bend,
wherein the at least one of the single guiding element and single guiding receptacle extends over at least one of the region of a width of the cutting device and the contact surface of the main body, against which the cutting device is pressed by the clamping device,
wherein the at least one of the single guiding element and guiding receptacle extends over an entirety of the width.

4. The tool according to claim 1, wherein the guiding device is a single guiding element including a pin inserted into the main body of the tool or into the cutting device, a longitudinal axis of which extends perpendicular to the center axis of the main body of the tool.

5. The tool according to claim 1, wherein the at least one of the single guiding element and the single guiding receptacle has two guiding regions which are arranged at a distance from one another and extend at least to an edge of the cutting device or a contact surface of the main body of the tool.

6. The tool according to claim 1, wherein the adjusting device acts on a side surface of the cutting device, and a three-point contact is realized by two contact surfaces in a region of the base surface of the cutting device and by the adjusting device which acts on the side surface of the cutting device.

7. The tool according to claim 1, wherein the cutting device has a cutter plate which incorporates the at least one geometrically determined cutting edge and a receptacle which accommodates the at least one cutter plate.

8. The tool according to claim 7, wherein the at least one of the single guiding element and the single guiding receptacle is realized on a base surface of the receptacle, the base surface of the receptacle being the base surface of the cutting device.

9. The tool according to claim 7, wherein the cutter plate has an underside which rests on a base of a recess in the receptacle, and a top side provided with at least one clamping slot.

10. The tool according to claim 9, wherein the clamping device has a clamping claw with a clamping lip which engages in the at least one clamping slot of the cutter plate.

11. The tool according to claim 9, wherein, in an installed position, the at least one clamping slot of the cutter plate runs at an angle to an imaginary line which is perpendicular to the center axis of the main body of the tool.

12. The tool according to claim 1, wherein the tool is a fine machining tool.

13. The tool according to claim 1, wherein the tool is a reamer.

14. A tool for machining holes in workpieces, the tool comprising:
a main body having a center axis;
at least one cutting device having a cutting edge;
a clamping device for securely clamping the cutting device to the main body of the tool;
an adjusting device which interacts with the cutting device for adjusting a machining diameter of the tool, and a guiding device including an elongated guiding element which interacts with an elongated guiding receptacles such that the cutting device is guided in a sliding manner perpendicular to the center axis during a displacement when the adjusting device is activated, the guiding element is provided on one of the cutting device and the main body of the tool and the guiding receptacle is provided on the other of the cutting device and the main body of the tool, the guiding element and the guiding receptacle extending perpendicular to the center axis of the main body of the tool, wherein the cutting device has a base surface and is supported by a three-point contact on the main body of the tool in a region of the base surface, the cutting device has at least one supporting surface arranged at a distance from the at least one of the single guiding element and the single guiding receptacle, the at least one supporting surface provided in the region of the base surface which encloses an angle with the base surface and merges into the base surface via a bend, and the cutting device is supported on a contact surface on the main body by at least one of the supporting surface and the bend, wherein the guiding receptacle is a slot in the base surface and wherein the slot is semicircular and has first and second regions defining first and second guiding surfaces, respectively, the first and second guiding surfaces spaced apart from one another.

15. The tool according to claim 14, wherein the guiding device has at least one of a single guiding element and a single guiding receptacle, and the guiding element has an elongated elevation and the guiding receptacle has an elongated recess.

16. The tool according to claim 14, wherein the supporting surface slopes from the bend with respect to the base surface such that an end of the supporting surface is set back from the base surface.

17. The tool according to claim 14, wherein the at least one supporting surface and the base surface are both planar and meet at a line defined by the bend.

\* \* \* \* \*